Nov. 22, 1960 E. McGALL 2,961,385

METHOD OF FORMING SLIP-RINGS IN ANNULAR GROOVES

Filed June 30, 1958

INVENTOR.
EDWARD MC GALL
BY Albert F. Kronman
ATTORNEY

United States Patent Office 2,961,385

Patented Nov. 22, 1960

2,961,385

METHOD OF FORMING SLIP-RINGS IN ANNULAR GROOVES

Edward McGall, Orange, N.J., assignor to Breeze Corporation, Inc., Union, N.J., a corporation of New Jersey Filed June 30, 1958, Ser. No. 745,348

8 Claims. (Cl. 204—15)

This invention relates to a method of forming one or more slip-rings on a suitable insulating form such as, a cylinder having annular grooves formed therein and having a central axial hole, or a flat insulating support. The invention has particular reference to a method of electroplating conductive material on such a form in a manner which prevents subsequent conductor movement relative to the support, and insures a reliable electrical connection to an axial conductor.

Slip-rings have been formed by electroplating conductive material in annular grooves. However, the process has not been entirely satisfactory since the connecting wire was positioned in a radial hole at the bottom of the groove and supported only by conducting paint. This process sometimes placed electro-deposited material on the inside surface of the axial hole and generally resulted in a loose contact which had a tendency to break or resulted in a high resistance in the circuit.

The present invention corrects these structural deficiencies by first forming a secure, tight bond between the connecting wire and the insulator. Then the remainder of the ring is formed in the usual manner, generally starting the plating by using the same conductive material as the connecting wire.

One of the objects of this invention is to provide an improved method of forming slip-rings in annular grooves which avoids one or more of the disadvantages and limitations of prior art arrangements.

Another object of the invention is to provide a preliminary plating process which secures a connecting conductor firmly in the insulator material.

Another object of the invention is to mask portions of the conducting wires during a preliminary plating step which insures deposits of conducting material having high structural strength.

Another object of the invention is to deposit conducting material on the connection between an axial conductor and a connecting conductor in a radial hole.

Another object of the invention is to utilize an extending portion of a connecting conductor as a base for slip-ring plating.

One feature of the method includes the preliminary step of plating a connecting wire positioned in a radial hole in the insulator assembly. This step binds the connecting wire firmly in the hole.

Another feature of the method includes the step of plating a long connecting wire in a radial hole when the extended portion is masked to prevent plating action. After the preliminary plating, the mask is removed and the extended portion is wound around the bottom of the annular groove and the slip-ring is plated on the wire foundation.

For a better understanding of the present invention, together with other and further objects thereof, reference is made to the following description taken in connection with the accompanying drawings.

Figure 1:
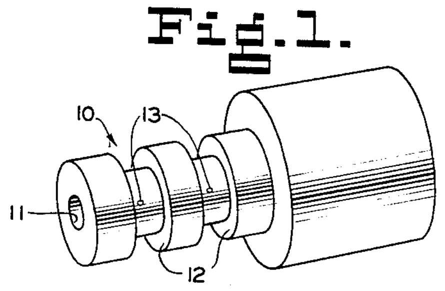
Figure 1 is a perspective view of an insulating cylinder having annular grooves prior to plating.

Referring now to Figure 1, the insulator 10 includes a cylindrical body having an axial hole 11 and one or more annular grooves 12. Each groove is connected to the axial hole 11 by a radial hole 13, arranged for a connecting conductor. While the invention is shown and described as applied to a cylindrical insulator, the same steps and the same materials may be used to form flat conductive slip-rings on a flat disk or commutator segments in grooves on insulating material having a wide range of shapes.

Figure 2:
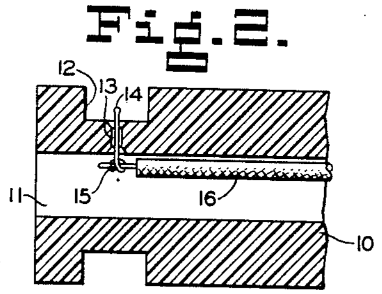
Figure 2 is a cross sectional fragmentary view of a cylinder having a groove for a slip-ring showing the first step in the process.

The cross sectional view shown in Figure 2 illustrates the first step in the method of forming the slip-ring. A connecting conductor 14 is positioned in hole 13 and connected to an axial conductor 15 which is provided with an insulating coating 16 for that portion of the conductor which lies beyond the conductor surfaces adjacent to hole 13. Conductors 14 and 15 are generally soldered together but this is not necessary and the two conductors may be portions of a single wire. Connecting conductor 14 extends a short distance above the bottom surface of the groove 12. The holes 13 may be tapered at each end thereof to receive plating metal.

Figure 3:
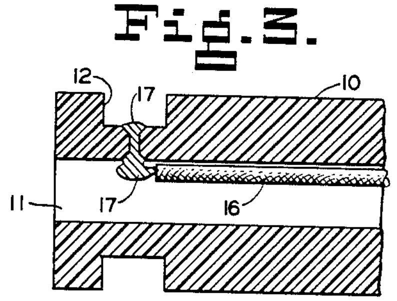
Figure 3 is another cross sectional view similar to Figure 2 but showing the structure after the preliminary plating step.

The assembly as shown in Figure 2 is given a preliminary plating in an electrolytic bath and a conductive coating 17 is formed around the wire 14 and the connection between wires 14 and 15. At the end of the preliminary plating step the insulator assembly appears as shown in Figure 3 with the radial hole filled with conductive material and extended button-like formations covering the conductor at each end of the hole and securely anchoring the conductive material in place. The assembly is now washed and dried.

The next step includes painting or otherwise depositing conductive material 18 on the bottom of the groove 12. This material may be powdered silver held by a binder, finely divided graphite, or any metallic coating applied by a spray gun. A mask of non-conductive material 20 may be applied to the plated joint and the inside surface of the plated connecting conductor to prevent further deposits, or the inside joint may be isolated from the action of the second plating bath by a rubber cork 21.

Figure 4:
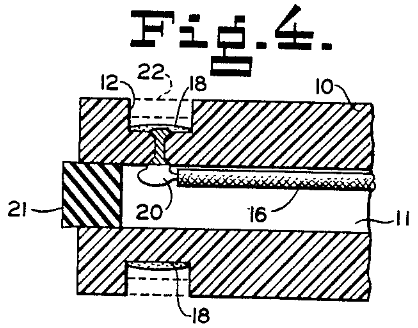
Figure 4 is another view similar to Figure 3 but showing the conductive paint applied to the bottom of the groove, ready for plating.
Figure 7:
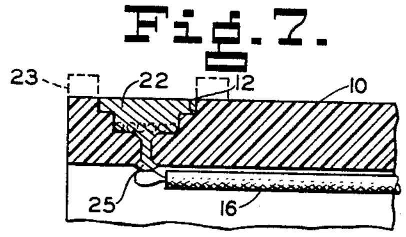
Figure 7 is a view similar to Figure 6 wherein the insulation has been removed from the connecting conductor and the extending portion has been wound around the bottom of the groove and plated with conductive material.

The next step includes plating the exposed conductive surfaces until enough material is accumulated to form a slip-ring (indicated by the dashed lines in Figure 4). The outside plated surface will generally be uneven. The entire assembly is therefore placed on a lathe and the excess material removed. The final result is shown in Figure 7 where the slip-ring material 22 and the adjoining surface of the insulation 10 has been cut off to present a cylindrical surface for contact by a brush. In forming the final surface, ridges 23, shown in dotted lines, may be left on the surface of the cylinder to guide the brushes and to lower the probability of flash-over.

Figure 5:
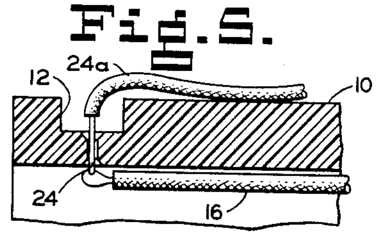
Figure 5 is a partial cross sectional view similar to Figure 2 but showing an extended connecting conductor with the extending portion masked by insulating material.
Figure 8:
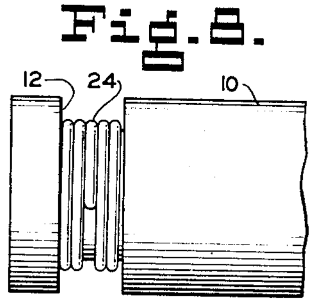
Figure 8 is a side view of the insulator shown in Figure 7 before the conductive metal has been applied.

An alternative arrangement is shown in Figure 5 where the connecting conductor 24 is positioned in the usual manner but includes a long extension 24A covered with insulating material. This arrangement is first plated as described above and, after plating includes the above described enlarged portions 25 and 24, securely fastened to the insulated portion. After the preliminary plating, the assembly is washed and dried and the insulation 24A stripped from the extended wire. The wire is then wrapped around the bottom of the groove 12 to form a base for subsequent plating action. The assembly will then have the appearance of Figure 8. Thereafter, the assembly is plated as described above. The end product shown in Figure 7 is thereby produced.

Figure 6:
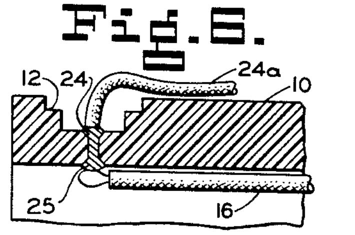
Figure 6 is a view similar to Figure 5 but showing the connecting conductor after the preliminary plating step.
Figure 9:
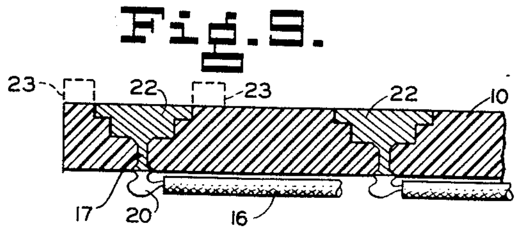
Figure 9 is a partial sectional view of a finished slip-ring, on an insulating plate or "pancake."

In addition to the specific processes and arrangements herein above set forth, it has been found that improved performance is secured and a structure having better grain, and freer of voids or stratified fissures is achieved when the configuration of the grooves is stepped, as shown in Figures 6, 7, and 9. By providing two or more steps in the groove prior to the plating operation, the silver is deposited first upon the bottom step until it is filled, and thereafter on the upper portion of the groove.

While the foregoing description and the drawings have been directed toward cylindrical slip-ring structures, it is to be understood that the techniques and methods described may also be applied to flat, plate like or "pancake" type slip-ring assemblies in which the conductive areas form concentric rings on a flat plate. A flat plate or "pancake" slip-ring structure is illustrated in Figure 9 in which the conductive surfaces are deposited on one face of the insulator.

Slip rings made in accordance with the above described method are stable, grip the supporting insulator, and always remain in secure contact with the connecting conductor and the axial conductor.

Having thus fully described the invention, what is claimed as new and desired to be secured by Letters Patent of the United States, is:

1. In a process for forming electrically conductive slip-rings supported by annularly grooved insulting means, the steps of positioning a conductor in a radial hole which joins the annular groove with a central axial bore, electroplating the surface of the conductor until the radial hole is filled, and the conductor at each end of the hole is covered with an extended, button-like formation of conductive material, depositing a conductive material on the bottom of the annular groove, and electroplating the exposed conductive surfaces until sufficient material is deposited to form a slip-ring.

2. In a process for forming electrically conductive slip-rings supported by annularly grooved insulating means and connected to a central axial conductor, the steps of positioning a connecting conductor in a radial hole which joins the annular groove with a central axial opening, masking with an insulating coating all parts of the conductor lying beyond the surfaces adjacent said radial hole, electroplating the exposed surfaces of the conductors until the radial hole is filled, and the conductor at each end of the hole is covered with an extended, button-like formation of conductive material, depositing a conductive material on the bottom of the annular groove, and electroplating the exposed conductive surfaces until sufficient material is deposited to form a slip-ring.

3. In a process for forming electrically conductive slip-rings supported by annularly grooved insulating means and connected to a central axial conductor, the steps of positioning a connecting conductor in a radial hole which joins the annular groove with a central axial opening, masking with an insulating coating all the parts of the conductors lying beyond the surfaces adjacent to said radial hole, electroplating the exposed surfaces of the conductors until the hole is filled with electro-deposited conductive material and the conductor at each end of the hole is covered with an extended, button-like formation of conductive material, washing and drying the plated conductors, depositing a conductive material on the bottom of the annular groove, and electroplating the exposed conductive surfaces until sufficient material is deposited to form a slip-ring.

4. In a process for forming electrically conductive slip-rings supported by annularly grooved insulating means and connected to a central axial conductor, the steps of positioning a connecting conductor in a radial hole having tapered portions at each end thereof, which joins the annular groove with a central axial opening, said axial conductor and said connecting conductor connected by a junction adjacent to said radial hole, masking with an insulating coating all the parts of the conductors lying beyond the surfaces adjacent to said radial hole, electroplating the exposed surfaces of the conductors until the hole is filled with electro-deposited conductive material, and the conductor at each end of the hole is covered with an extended, button-like formation of conductive material, washing and drying the plated conductors, masking said plated junction by an insulating coating, depositing a conductive material on the bottom of the annular groove, and electroplating the exposed conductive surfaces until sufficient material is deposited to form a slip-ring.

5. In a process for forming an electrically conductive slip-ring supported by an annular groove in a cylindrical insulator, the steps of positioning a conductor in a radial hole having a taper at the outer end thereof, which joins the annular groove with an opening parallel with the cylinder axis, electroplating the surface of the conductor until the radial hole and tapered portion is filled, winding a portion of said conductor around the bottom of said annular groove, and electroplating the conductor in the groove until sufficient material is deposited within the groove to form a slip-ring.

6. In a process for forming an electrically conductive slip-ring supported by an annular groove in a cylindrical insulator and connected to an axial conductor lying in an axial opening, the steps of positioning a connecting conductor in a radial hole which joins the annular groove with said axial opening, masking with an insulating coating all of the parts of the conductors lying beyond the surfaces adjacent to the radial hole, electroplating the exposed surfaces of the conductors until the radial hole is filled with electro-deposited conductive material and the conductor at each end of the hole is covered with an extended, button-like formation of conductive material, washing and drying the plated conductors, winding a portion of said connecting conductors around the bottom of said annular groove, and electroplating the connecting conductor in the groove until sufficient material is deposited to form a slip-ring.

7. In a process for forming an electrically conductive slip-ring supported by an annular groove in a cylindrical insulator and connected to an axial conductor, the steps of positioning a connecting conductor in a radial hole which joins the annular groove with a central axial opening, said axial conductor and said connecting conductor connected by a junction adjacent to the radial hole, masking with an insulating coating all the parts of the conductors lying beyond the surfaces adjacent to said radial hole, electroplating the exposed surfaces of the conductors until the hole is filled with electro-deposited conductive material and the conductor at each end of the hole is covered with an extended, button-like formation of conductive material, depositing a conductive material on the bottom of the annular groove, and electroplating the exposed conductive surfaces until sufficient material is deposited to form a slip-ring.

8. In a process for forming electrically conductive slip rings supported by grooved insulating means, the steps of positioning a conductor in a hole which traverses the insulating material beneath the groove, electroplating the surface of the conductor until the said hole is filled and the conductor at each end of the hole is covered with an extended button like formation of conductive material, depositing additional conductive material on the bottom of the groove and thereafter electroplating the exposed conductive surfaces until sufficient material is deposited to form a slip ring.

References Cited in the file of this patent

UNITED STATES PATENTS

| | | |
|---|---|---|
| 264,653 | Edison | Sept. 19, 1882 |
| 678,383 | Eppler | July 16, 1901 |
| 2,382,209 | Crocker | Aug. 14, 1945 |
| 2,696,576 | Pandapas | Dec. 7, 1954 |
| 2,721,822 | Pritikin | Oct. 25, 1955 |
| 2,786,985 | Meretey | Mar. 26, 1957 |

FOREIGN PATENTS

| | | |
|---|---|---|
| 19,919 | Great Britain | Nov. 4, 1893 |

OTHER REFERENCES

New Advances in Printed Circuits, U.S. Department of Commerce, National Bureau of Standards, Miscellaneous Publication 192, Nov. 22, 1948, pp. 38–42.